(12) United States Patent
Zhou et al.

(10) Patent No.: US 9,112,799 B2
(45) Date of Patent: Aug. 18, 2015

(54) NETWORK PACKET LOSS PROCESSING METHOD AND APPARATUS

(71) Applicant: Huawei Technologies Co., Ltd., Shenzhen, Guangdong (CN)

(72) Inventors: Bing Zhou, Shenzhen (CN); Jingyuan Wang, Shenzhen (CN); Jiangtao Wen, Shenzhen (CN); Zixuan Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 13/898,376

(22) Filed: May 20, 2013

(65) Prior Publication Data

US 2013/0322246 A1 Dec. 5, 2013
US 2014/0198651 A9 Jul. 17, 2014

Related U.S. Application Data

(63) Continuation of application No. PCT/CN2011/074156, filed on May 17, 2011.

(30) Foreign Application Priority Data

Nov. 18, 2010 (CN) .......................... 2010 1 0550043

(51) Int. Cl.
*H04L 12/807* (2013.01)
*H04L 12/801* (2013.01)
*H04L 12/825* (2013.01)
*H04L 12/835* (2013.01)
*H04L 29/06* (2006.01)

(52) U.S. Cl.
CPC ................ *H04L 47/27* (2013.01); *H04L 47/11* (2013.01); *H04L 47/25* (2013.01); *H04L 47/30* (2013.01); *H04L 69/163* (2013.01)

(58) Field of Classification Search
None
See application file for complete search history.

(56) References Cited

U.S. PATENT DOCUMENTS

2002/0090003 A1 7/2002 Melpignano et al.
(Continued)

FOREIGN PATENT DOCUMENTS

CN 1556629 A 12/2004
CN 101115002 A 1/2008
(Continued)

OTHER PUBLICATIONS

Written Opinion of the International Searching Authority dated Aug. 25, 2011 in connection with International Patent Application No. PCT/CN2011/074156.
(Continued)

*Primary Examiner* — Hassan Phillips
*Assistant Examiner* — Omeed D Rahgozar (57) ABSTRACT

Embodiments of the present invention disclose a network packet loss processing method and apparatus. The method in the present invention includes: comparing a value of a current congestion window of a network with a buffer threshold when a packet loss event is detected, where the buffer threshold is used to indicate a data bearing capability of the entire network, where the data bearing capability is obtained by adding a data bearing capability of a link in the network and a data bearing capability of a buffer of a node in the network; if the value of the current congestion window is smaller than the buffer threshold, not performing backoff processing on the current congestion window; and if the value of the current congestion window is greater than or equal to the buffer threshold, performing backoff processing on the current congestion window.

10 Claims, 5 Drawing Sheets

(56) References Cited

U.S. PATENT DOCUMENTS

| | | |
|---|---|---|
| 2002/0154602 A1 | 10/2002 | Garcia-Luna-Aceves et al. |
| 2004/0032827 A1 | 2/2004 | Hill et al. |
| 2006/0092840 A1* | 5/2006 | Kwan et al. .............. 370/230.1 |
| 2006/0171313 A1* | 8/2006 | Shimonishi .............. 370/229 |
| 2008/0037552 A1 | 2/2008 | Dos Remedios et al. |

FOREIGN PATENT DOCUMENTS

| | | |
|---|---|---|
| CN | 101557607 A | 10/2009 |
| CN | 101686100 A | 3/2010 |

OTHER PUBLICATIONS

Injong Rhee, et al., "CUBIC: A New TCP-Friendly High-Speed TCP Variant", 6 pages.

Cheng Peng Fu, et al., "TCP Veno: TCP Enhancement for Transmission Over Wireless Access Networks", IEEE Journal on Selected Areas in Communications, vol. 21, No. 2, Feb. 2003, p. 216-228.

Saverio Mascolo, et al., "TCP Westwood: Bandwidth Estimation for Enhanced Transport over Wireless Links", ACM SIGMOBILE Jul. 2001, p. 287-297.

International Search Report dated Aug. 25, 2011 in connection with International Patent Application No. PCT/CN2011/074156.

* cited by examiner

NETWORK PACKET LOSS PROCESSING METHOD AND APPARATUS

CROSS-REFERENCE TO RELATED APPLICATION

This application is a continuation of International Application No. PCT/CN2011/074156, filed on May 17, 2011, which claims priority to Chinese Patent Application No. 201010550043.9, filed on Nov. 18, 2010, both of which are hereby incorporated by reference in their entireties.

TECHNICAL FIELD

The present invention relates to the field of communications, and in particular, to a network packet loss processing method and apparatus.

BACKGROUND

An earliest TCP (Transmission Control Protocol) data transmission mechanism is designed for a wired network, and the network includes a TCP sending end (hereinafter referred to as sending end) and a TCP receiving end (hereinafter referred to as receiving end). The sending end receives an acknowledgement from the receiving end after sending every packet, where an acknowledgement signal is an ACK (ACKnowledgement) signal. If no ACK is received within a specified time, the sending end retransmits the packet. The receiving end sends an acknowledgement to the sending end after receiving every packet. If receiving a data segment that arrives out of sequence, the receiving end stores the data segment into a buffer, and sends a request for an intermediate lost packet (in a manner of repeating an ACK) to receive the lost packet. The receiving end submits a sequential data segment in the buffer to an application layer at a certain moment.

A data sending rate of the sending end depends on two factors: a buffer size of the receiving end and a bandwidth that can be provided by a communication network. In a process of transmitting TCP data of a wired network, assuming that all packet loss events are caused by network congestion, once the sending end detects a packet loss event, the sending end decreases a sending rate of packets to reduce a network load and avoid congestion. However, in a wireless network environment, the operation is infeasible, because random packet loss caused by a factor other than network congestion may occur on a transmission link of a wireless network. That is, because a wireless link is instable, a burst error occurs in a packet transmission process, so that the TCP receiving end cannot identify and acknowledge the packet. As a result, the packet is "lost". The burst error occurs randomly, and is usually called random packet loss. If the sending end blindly decreases the data sending rate because it detects a random packet loss event, TCP transmission performance is deteriorated.

Currently, the sending end uses a sliding window mechanism to control the rate. Corresponding to the foregoing two factors, the sending end manages two windows: a receiving window (rcv_wnd) and congestion window (cwnd, Congestion Window), where rcv_wnd indicates a data receiving capability of the receiving end, and cwnd indicates a data transmission capability of the network. In TCP Veno in the prior art, to distinguish whether a packet loss event in the network is caused by network congestion or random packet loss, at the sending end, an identifier N indicating network bandwidth utilization and a constant reference beta are used. A value of N is RTTmin*(cwnd/RTTmin−cwnd/RTT), where in RTTmin (Minimum Round Trip Time), RTTmin indicates a minimum round trip delay detected by the sending end, and its value is an integer that is greater than 0, and RTT (Round Trip Time) indicates a round trip delay. When the sending end detects a packet loss event identified by three repeated ACKs, the sending end compares N with beta. When N is smaller than a beta value, it indicates that a current network bandwidth is not fully utilized, and the sending end considers that the packet loss event is caused by random packet loss, and backs off ssthresh (Slow Start Thresh, slow start threshold) to cwnd*(4/5). When N is greater than or equal to the beta value, it indicates that the current available network bandwidth is fully utilized, and the sending end considers that the packet loss event is caused by network congestion, and backs off ssthresh to cwnd/2. In TCP congestion control, the congestion window value cwnd is compared with the slow start threshold ssthresh. If cwnd is smaller than ssthresh, it is in a slow start state, and a cwnd value increases by 1 every time when the TCP sending end receives an ACK. If cwnd is greater than or equal to ssthresh, it is in a congestion avoidance state, and the cwnd value increases by 1/cwnd every time when the TCP sending end receives one ACK, that is, the cwnd value increases by 1 only when the TCP sending end receives cwnd ACKs.

During the implementation of the foregoing network packet loss processing, the inventor finds that the prior art has at least the following problems: Although, in the prior art, certain filtering is performed on random packet loss in a network, whether a packet loss event is caused by random packet loss cannot be accurately judged because a critical value beta indicating whether a network bandwidth is fully utilized or not fully utilized is a manually-set parameter; and furthermore, backoff processing is still performed on a congestion window after a random packet loss event is identified, so that the sending end transmits data at a lower rate. Therefore, in a network environment with a high packet loss ratio, data transmission performance cannot be ensured.

SUMMARY

Embodiments of the present invention provide a network packet loss processing method and apparatus, so that in a network environment with a high packet loss ratio, data transmission performance is greatly improved.

To achieve the foregoing objectives, the embodiments of the present invention adopt the following technical solutions:

In one aspect, an embodiment of the present invention provides a network packet loss processing method, including:

comparing a value of a current congestion window of a network with a buffer threshold when a packet loss event is detected, where the buffer threshold is used to indicate a data bearing capability of the entire network, where the data bearing capability is obtained by adding a data bearing capability of a link in the network and a data bearing capability of a buffer of a node in the network;

if the value of the current congestion window is smaller than the buffer threshold, determining that the current packet loss event is not caused by congestion packet loss, and not performing backoff processing on the current congestion window; and if the value of the current congestion window is greater than or equal to the buffer threshold, determining that the current packet loss event is caused by congestion packet loss, and performing backoff processing on the current congestion window.

In another aspect, an embodiment of the present invention provides a network packet loss processing apparatus, including:

a comparing unit, configured to compare a value of a current congestion window of a network with a buffer threshold when a packet loss event is detected, where the buffer threshold is used to indicate a data bearing capability of the entire network, where the data bearing capability is obtained by adding a data bearing capability of a link in the network and a data bearing capability of a buffer of a node in the network;

a first processing unit, configured to determine that the current packet loss event is not caused by congestion packet loss, and configured not to perform backoff processing on the current congestion window, when the comparing unit determines that the value of the current congestion window is smaller than the buffer threshold; and a second processing unit, configured to determine that the current packet loss event is caused by congestion packet loss, and to perform backoff processing on the current congestion window, when the comparing unit determines that the value of the current congestion window is greater than or equal to the buffer threshold.

Compared with a buffer threshold in the prior art, the buffer threshold in the technical solutions of the present invention includes two parts: One part indicates a data bearing capability of a link in the network and the other part indicates a data bearing capability of a buffer of a node in the network, so that a data bearing capability of the entire network can be determined accurately. Congestion packet loss is often caused by data loss when the size of data sent by the data sending end is greater than the data bearing capability of the entire network; a value of a congestion window decides a data transmission capability of a sending end; and backoff processing is not performed on the current congestion window when it is determined that a packet loss event is not caused by congestion packet loss if the value of the current congestion window is smaller than the buffer threshold, so that a greater value of the congestion window is maintained and that the network can have better data transmission performance.

BRIEF DESCRIPTION OF THE DRAWINGS

To describe the technical solutions in the embodiments of the present invention or in the prior art more clearly, the accompanying drawings required for describing the embodiments or the prior art are briefly introduced in the following. Apparently, the accompanying drawings in the following description merely show some embodiments of the present invention, and persons of ordinary skill in the art still may still derive other drawings from these accompanying drawings without creative efforts.

DETAILED DESCRIPTION

Because a value of a congestion window reflects a data transmission capability of a sending end, within a certain range, the greater the value is, the higher the data transmission performance of the sending end is. However, the value of the congestion window cannot be too great, or else, a network is congested. Therefore, the value of the congestion window needs to be set properly, so that data transmission performance is maximally improved without affecting network congestion. Based on the foregoing theory, in embodiments of the present invention, the value of the congestion window is kept within a proper range to the largest extent. Within the range, backoff processing does not need to be performed on the value of the congestion, window, and therefore data transmission performance is maximally improved.

In the network, congestion packet loss is caused by the fact that a data bearing capability, of the entire network is smaller than data amount sent by a data sending end. When the data bearing capability of the entire network is smaller than the data amount sent by the data sending end, data may be lost because the data cannot be smoothly transmitted and cannot be buffered either. Therefore, as long as the data amount sent by the data sending end does not exceed the data bearing capability of the entire network, data loss due to congestion does not occur. Based on the foregoing principle, in the embodiments of the present invention, the buffer threshold is used to indicate the data bearing capability of the entire network, where the data bearing capability is obtained by adding two parts: One part is a data bearing capability of a link in the network and the other part is a data bearing capability of a buffer of a node in the network. As a result, the congestion window may be within a proper range (which is smaller than the buffer threshold) to the largest extent; and within the range, it is considered that congestion packet loss is not caused, and therefore, backoff processing does not need to be performed on the value of the congestion window, so that the data sending end continues to transmit data at a previous higher rate to improve data transmission performance. It is considered that data loss is caused by congestion only when the congestion window exceeds the proper range (which exceeds the buffer threshold), and in this case, backoff processing is performed, so as to reduce a data transmission rate of the sending end and ensure accurate transmission of data.

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
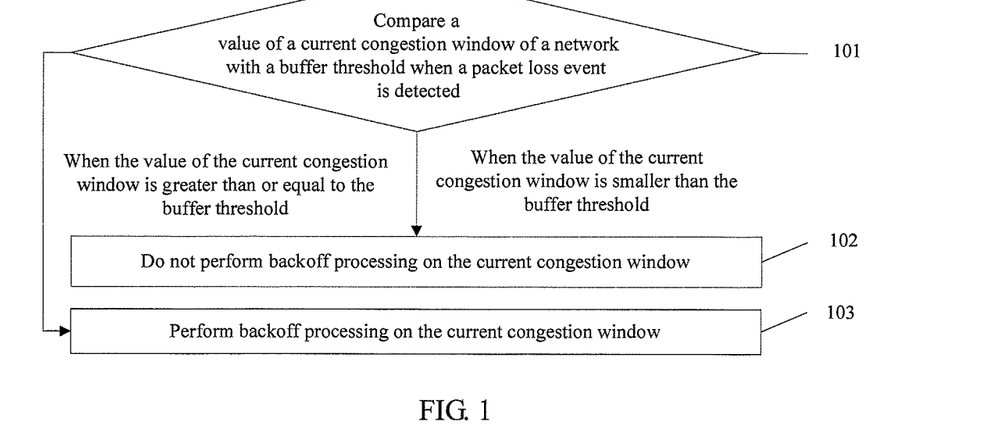
FIG. 1 is a flowchart of a network packet loss processing method according to Embodiment 1 of the present invention.

An embodiment of the present invention provides a network packet loss processing method. As shown in FIG. 1, the method includes:

101. Compare a value of a current congestion window of a network with a buffer threshold when a packet loss event is detected; if the value of the current congestion window is smaller than the buffer threshold, determine that the current packet loss event is not caused by congestion packet loss, and execute step 102; and if the value of the current congestion window is greater than or equal to the buffer threshold, determine that the current packet loss event is caused by congestion packet loss, and execute step 103.

The buffer threshold is used to indicate a data bearing capability of the entire network, where the data bearing capability is obtained by adding a data bearing capability of a link in the network and a data bearing capability of a buffer of a node in the network. The data bearing capability of a link in the network indicates a capability of the link for transmitting data in the network, for example, the capability may be determined by the number of packets transmitted within a certain time range, which is not limited in this embodiment of the present invention, and may also be expressed by other means in the art. The data bearing capability of a buffer of a node in the network indicates a capability of the buffer of the node for containing data in the network, for example, the capability may be determined by the number of packets that can be contained, which is not limited in this embodiment of the present invention, and may also be expressed by other means in the art.

Specifically, the buffer threshold may be obtained through the following formula (1), and the formula (1) is:

$$m\_cwnd = \frac{BWE * RTTmin}{MSS} + \frac{BWE * APLHA}{MSS}. \quad \text{(formula 1)}$$

In the formula, m-cwnd indicates the buffer threshold, and its value is an integer that is greater than 0;

$$\frac{BWE * RTTmin}{MSS}$$

indicates a data bearing capability of a link in the network, where BWE indicates a transmission bandwidth of a link from a sending end to a receiving end in network transmission and its value is an integer that is greater than 0, RTTmin indicates a minimum round trip delay that is detected by the sending end and is in units of milliseconds, and its value is an integer that is greater than 0, and MSS indicates a maximum segment size used in network transmission and its value is an integer that is greater than 0; and $$\frac{BWE * ALPHA}{MSS}$$

indicates a data bearing capability of a buffer of a node in the network, where EWE indicates the transmission bandwidth of the link from the sending end to the receiving end in the network transmission and its value is an integer that is greater than 0, ALPHA indicates an adaptive parameter of the data bearing capability of the buffer of the node in the network and its value is in direct proportion to the minimum round trip delay detected by the sending end and a network packet loss ratio, and MSS indicates the maximum segment size used in the network transmission and its value is an integer that is greater than 0. It should be noted that the formula for calculating the buffer threshold is only an embodiment. In actual use, other calculating methods may also be used to obtain the buffer threshold, which is not limited in this embodiment of the present invention.

Further, the ALPHA is obtained through the following formula (2), and the formula (2) is:

$$ALPHA = \frac{k * RTTmin}{LD}. \quad \text{(formula 2)}$$

In the formula, k is a scaling factor that is greater than 1; RTTmin is the minimum round trip delay detected by the sending end and its value is an integer that is greater than 0; and LD is a packet loss interval that is in inverse proportion to the packet loss ratio, and is determined by the number of packets received on average when one packet loss event is detected. For example, for packets with sequence numbers 1, 2, 3, 4, 5, and 6, after receiving ACKs with, sequence numbers 1, 2, 3, 4, and 5, a TCP sending end detects that the packet with the sequence number 6 is lost; and in this case, the packet loss interval is 5. It should be noted that the formula for calculating the ALPHA value is only an embodiment. In actual use, other calculating methods may also be used to obtain the ALPHA value, which is not limited in this embodiment of the present invention.

Further, the ALPHA value may be obtained according to LD update through the foregoing formula, and the LD update may be obtained by using the following method. The method includes:

counting the number of ACKs received within a predetermined time period and the number of packet loss events; and dividing the number of ACKs received within the predetermined time period by the number of packet loss events to obtain a packet loss interval within the predetermined time period, where the counting the number of ACKs received within the predetermined time period and the number of packet loss events may specifically include the following: The sending end initializes the number of received ACKs and the number of packet loss events to 0; then within the predetermined time period, the sending end adds 1 to ACK_Count every time when the sending end receives one ACK; and the sending end adds 1 to Lost_Count every time when the sending end detects one packet loss event.

Further, to avoid great fluctuation of an LD value obtained through calculation, after the LD is obtained through calculation, in this embodiment of the present invention, smooth processing may further be performed on the obtained LD, so that the obtained LD value is relatively smooth. To be specific, a $\{½, ½\}$ smooth filter may be used to perform smooth processing on the obtained packet loss interval within the predetermined time period to obtain a smooth-processed packet loss interval within the predetermined time period, where $\{½, ½\}$ indicates that a half of values passing through the filter are old values, and that a half of values passing through the filter are new values.

Specifically, the LD may be obtained by adopting the following formula (3), and the formula (3) is:

$$LD = \frac{1}{2}\left(LD' + \frac{ACK\_Count}{Lost\_Count}\right). \quad \text{(formula 3)}$$

In the formula, LD' is a value before the packet loss interval is updated, ACK_Count is the number of acknowledgement signals ACKs received within the predetermined time period, and Lost_Count is the number of packet loss events received within the predetermined time period.

Determining, according to the value of the current congestion window of the network and the buffer threshold, whether the current packet loss event is caused by congestion packet loss, may be executed when the sending end detects a packet loss event, for example, executed when the sending end receives three repeated ACKs or a retransmission timer expires. The following method may be used and includes:

comparing the value of the current congestion window of the network with the buffer threshold; if the value of the current congestion window is smaller than the buffer threshold, determining that the current packet loss event is not caused by congestion packet loss; and if the value of the current congestion window is greater than or equal to the buffer threshold, determining that the current packet loss event is caused by congestion packet loss. Because congestion packet loss is caused by the fact that the data bearing capability of the entire network is smaller than data amount sent by the sending end, while the value of the congestion window reflects a data transmission capability of the sending end, and the buffer threshold indicates the data bearing capability of the entire network, when the value of the current congestion window is smaller than the buffer threshold, it indicates that the data bearing capability of the entire network is greater than the data amount sent by the data sending end. In this case, data loss caused by failure of smooth transmission or buffering does not occur, and the sending end considers that the packet loss event is not caused by congestion packet loss. When the value of the current congestion window is greater than or equal to the buffer threshold, it indicates that the data bearing capability of the entire network is smaller than or equal to the data amount sent by the data sending end. In this case, data loss caused by failure of smooth transmission or buffering may occur, and the sending end considers that the packet loss event is caused by congestion packet loss.

102. Do not perform backoff processing on the current congestion window.

Not performing backoff processing on the current congestion window means not performing processing on identified non-congestion packet loss, so that the packet loss event is ignored. A specific operation may be as follows: When the sending end receives non-congestion packet loss identified by three consecutive ACKs, in a fast retransmission/fast recovery process, a cwnd value remains unchanged, and after the fast retransmission/fast recovery process is ended, the cwnd value also remains unchanged; and when a TOP-THU identifies non-congestion packet loss caused by expiry of the retransmission timer, the cwnd value remains to be a cwnd value before the packet loss event occurs.

103. Perform backoff processing on the current congestion window.

Any method for performing backoff processing on a congestion window in the prior art may be used to perform backoff processing on the current congestion window, which is not limited in this embodiment of the present invention, for example, backoff processing is performed on the current congestion window in a TCPW manner.

In this embodiment of the present invention, the buffer threshold includes two parts: One part indicates a data bearing capability of a link in the network and the other part indicates a data bearing capability of a buffer of a node in the network, so that a data bearing capability of the entire network can be determined accurately. Congestion packet loss is often caused by data loss when the size of data sent by the data sending end is greater than the data bearing capability of the entire network; a value of a congestion window decides a data transmission capability of a sending end; and backoff processing is not performed on the current congestion window when it is determined that a packet loss event is not caused by congestion packet loss, so that a greater value of the congestion window is maintained and that the network can have better data transmission performance.

Moreover, in this embodiment of the present invention, the buffer threshold is updated continuously with the update of the ALPHA, so that non-congestion packet loss can be determined more accurately, and therefore data transmission performance is further improved in a network environment with a high packet loss ratio.

Further, in a process of network packet loss processing, the value of the current congestion window may also be adjusted in real time according to an ACK (ACKnowledgement, a signal used for acknowledging in network transmission) received by the sending end. Therefore, after the sending end receives one ACK, the method further includes:

when the value of the current congestion window is smaller than the slow start threshold (ssthresh), adding 1 to the value of the current congestion window every time when the sending end receives one ACK;

when the value of the current congestion window is greater than or equal to the slow start threshold and is smaller than the buffer threshold, adding max (1, (m_cwnd−cwnd)/2) to the value of the current congestion window every time when the sending end receives one ACK, where max (1, (m_cwnd−cwnd)/2) indicates the greater one of 1 and (m_cwnd−cwnd)/2, the m_cwnd is the buffer threshold, and the cwnd is the value of the current congestion window; and when the value of the current congestion window is greater than or equal to the buffer threshold, adding min (½, BETA/cwnd) to the value of the current congestion window every time when the sending end receives one ACK, where min (½, BETA/cwnd) indicates the smaller one of ½ and BETA/cwnd, and the BETA is an adaptive parameter that is greater than 1 and its value is in direct proportion to a minimum round trip delay detected by the sending end and a network packet loss ratio.

Further, the BETA is obtained through the following formula (4), and the formula (4) is:

$$\text{BETA} = 2^{\frac{s}{LD}} * \max\left[1, \left(\frac{RTT\min}{t}\right)\right]. \quad \text{(formula 4)}$$

In the formula, s is a scaling factor that is greater than 1; LD is a packet loss interval that is in inverse proportion to the packet loss ratio, and is determined by the number of packets received on average when one packet loss event is detected, for example, for packets with sequence numbers 1, 2, 3, 4, 5, and 6, after receiving ACKs with sequence numbers 1, 2, 3, 4, and 5, a TCP sending end detects that the packet with the sequence number 6 is lost, and in this case, the packet loss interval is 5; and RTTmin is the minimum round trip delay detected by the sending end; t is reference time and its value is an integer that is greater than 0; and $$\max\left[1, \left(\frac{RTT\min}{t}\right)\right]$$

indicates the greater one of 1 and $$\left(\frac{RTT\min}{t}\right).$$

It should be noted that the formula for calculating the BETA value is only an embodiment. In actual use, other calculating methods may also be used to obtain the BETA value, which is not limited in this embodiment of the present invention.

In addition, it should be noted that the LD in the formula for calculating the BETA value may be calculated with reference to corresponding description about the calculation of the ALPHA value, which is not further described in this embodiment of the present invention herein.

In this embodiment of the present invention, the value of the congestion window can be adjusted according to an ACK that is received in real time, so that a proper value of the congestion window is maintained and that the network can have better data transmission performance.

Embodiment 2

Figure 2:
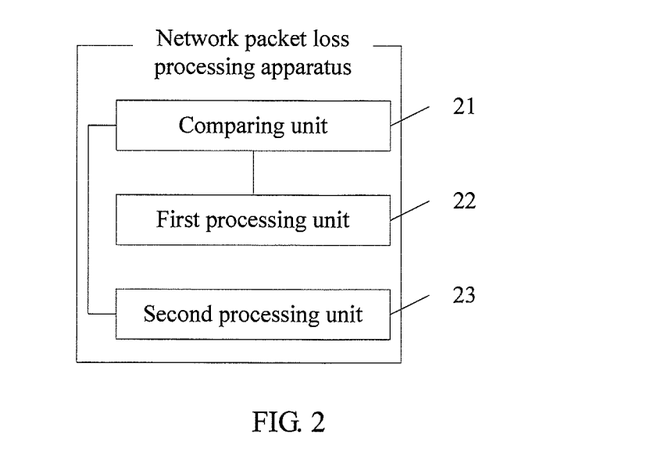
FIG. 2 is a composition block diagram of a network packet loss processing apparatus according to Embodiment 2 of the present invention.

An embodiment of the present invention provides a network packet loss processing apparatus. The apparatus may be an independent device or may also be integrated into a sending end, which is not limited in this embodiment of the present invention. As shown in FIG. 2, the apparatus includes: a comparing unit 21, a first processing unit 22, and a second processing unit 23.

The comparing unit 21 is configured to compare a value of a current congestion window of a network with a buffer threshold when a packet loss event is detected, where the buffer threshold is used to indicate a data bearing capability of the entire network. The buffer threshold indicates the data bearing capability of the entire network, where the data bearing capability is obtained by adding a data bearing capability of a link in the network and a data bearing capability of a buffer of a node in the network. The data bearing capability of a link in the network indicates a capability of the link for transmitting data in the network, for example, the capability may be determined by the number of packets transmitted within a certain time range, which is not limited in this embodiment of the present invention, and may also be expressed by other means in the art. The data bearing capability of a buffer of a node in the network indicates a capability of the buffer of the node for containing data in the network, for example, the capability may be determined by the number of packets that can be contained, which is not limited in this embodiment of the present invention, and may also be expressed by other means in the art.

The first processing unit 22 is configured to determine that the current packet loss event is not caused by congestion packet loss, and configured not to perform backoff processing on the current congestion window, when the comparing unit 21 determines that the value of the current congestion window is smaller than the buffer threshold. The first processing unit 22 does not perform backoff processing on the current congestion window, that is, does not perform processing on an identified non-congestion packet loss, so that the packet loss event is ignored. A specific operation may be as follows: When the sending end receives non-congestion packet loss identified by three consecutive ACKs, in a fast retransmission/fast recovery process, a cwnd value remains unchanged, and after the fast retransmission/fast recovery process is ended, the cwnd value also remains unchanged; and when a TCP-THU identifies non-congestion packet loss caused by expiry of a retransmission timer, the cwnd value remains to be a cwnd value before the packet loss event occurs.

The second processing unit 23 is configured to determine that the current packet loss event is caused by congestion packet loss, and to perform backoff processing on the current congestion window, when the comparing unit determines that the value of the current congestion window is greater than or equal to the buffer threshold. The second processing unit 23 may use any method for performing backoff processing on a congestion window in the prior art to perform backoff processing on the current congestion window, which is not limited by in this embodiment of the present invention, for example, backoff processing is performed on the current congestion window in a TCPW manner.

It should be noted that the foregoing comparing unit, first processing unit, and second processing unit, and other units in this embodiment of the present invention are units defined according to logical functions in this embodiment of the present invention, and are not strictly delimited from each other; for example, only the comparing unit or one processing unit may be included, where the processing unit selects whether to perform backoff processing according to a judgment result of the comparing unit. These units may be implemented by using various universal processors (such as a CPU and a DSP) or a dedicated hardware processing circuit (such as an ASIC), which is not limited herein.

It should be noted that because congestion packet loss is caused by the fact that a data bearing capability of the entire network is smaller than data amount sent by a data sending end, while a value of a congestion window reflects a data transmission capability of the sending end, and the buffer threshold indicates the data bearing capability of the entire network. When the value of the current congestion window is smaller than the buffer threshold, it indicates that the data bearing capability of the entire network is greater than the data amount sent by the data sending end. In this case, data loss caused by failure of smooth transmission or buffering does not occur, and the sending end considers that the packet loss event is not caused by congestion packet loss. When the value of the current congestion window is greater than or equal to the buffer threshold, it indicates that the data bearing capability of the entire network is smaller than or equal to the data amount sent by the data sending end. In this case, data loss caused by failure of smooth transmission or buffering may occur, and the sending end considers that the packet loss event is caused by congestion packet loss.

Figure 3:
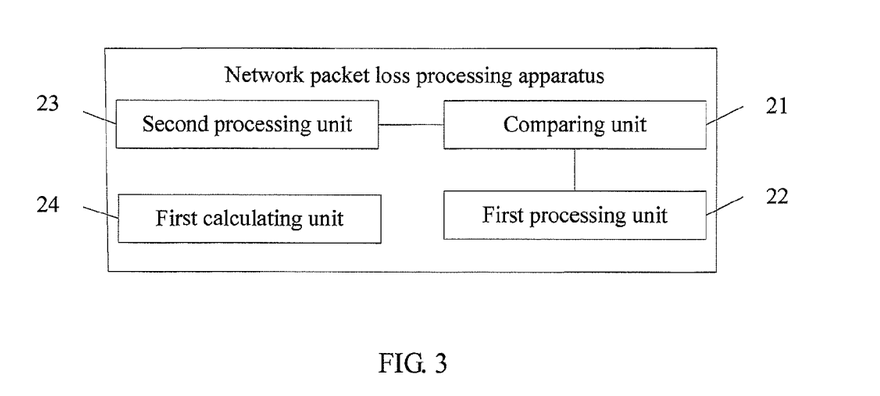
FIG. 3 is a composition block diagram of another network packet loss processing according to Embodiment 2 of the present invention.

Further, as shown in FIG. 3, the apparatus further includes a first calculating unit 24.

The first calculating unit 24 is configured to obtain the buffer threshold through the following formula (1), and the formula (1) is:

$$\text{m\_cwnd} = \frac{BWE * RTT\min}{MSS} + \frac{BWE * \text{ALPHA}}{MSS}. \quad \text{(formula 1)}$$

In the formula, m-cwnd indicates the buffer threshold, and its value is an integer that is greater than 0;

$$\frac{BWE * RTT\min}{MSS}$$

indicates a data bearing capability of a link in the network, where BWE indicates a transmission bandwidth of a link from a sending end to a receiving end in network transmission and its value is an integer that is greater than 0, RTTmin indicates a minimum round trip delay that is detected by the sending end and is in units of milliseconds, and its value is an integer that is greater than 0, and MSS indicates a maximum segment size used in network transmission and its value is an integer that is greater than 0; and $$\frac{BWE * ALPHA}{MSS}$$

indicates a data bearing capability of a buffer of a node in the network, where BWE indicates the transmission bandwidth of the link from the sending end to the receiving end in the network transmission and its value is an integer that is greater than 0, ALPHA indicates an adaptive parameter of the data bearing capability of the buffer of the node in the network and its value is in direct proportion to the minimum round trip delay detected by the sending end and a network packet loss ratio, and MSS indicates the maximum segment size used in the network transmission and its value is an integer that is greater than 0. It should be noted that the formula for calculating the buffer threshold is only an embodiment. In actual use, other calculating methods may also be used to obtain the buffer threshold, which is not limited in this embodiment of the present invention.

In this embodiment of the present invention, the buffer threshold includes two parts: One part indicates a data bearing capability of a link in the network and the other part indicates a data bearing capability of a buffer of a node in the network, so that a data bearing capability of the entire network can be determined accurately. Congestion packet loss is often caused by data loss when the data sent by the data sending end is greater than the data bearing capability of the entire network; a value of a congestion window decides a data transmission capability of a sending end; and backoff processing is not performed on the current congestion window when it is determined that a packet loss event is not caused by congestion packet loss, so that a greater value of the congestion window is maintained and that the network can have better data transmission performance.

Figure 4:
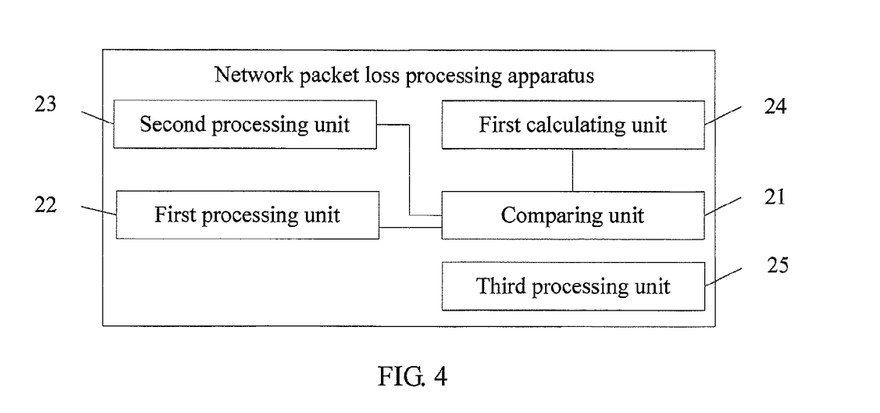
FIG. 4 is a composition block diagram of another network packet loss processing according to Embodiment 2 of the present invention.

Further, in a process of network packet loss processing, the value of the current congestion window may also be adjusted according to an ACK received by a receiving end. Specifically, as shown in FIG. 4, the apparatus further includes a third processing unit 25.

After one ACK is received, the third processing unit 25 is configured to, when the value of the current congestion window is smaller than the slow start threshold (ssthresh), add 1 to the value of the current congestion window every time when the sending end receives one ACK; or the third processing unit 25 is further configured to, when the value of the current congestion window is greater than or equal to the slow start threshold and is smaller than the buffer threshold, add max (1, (m_cwnd−cwnd)/2) to the value of the current congestion window every time when the sending end receives one ACK, where max (1, (m_cwnd−cwnd)/2) indicates the greater one of 1 and (m_cwnd−cwnd)/2, the m_cwnd is the buffer threshold, and the cwnd is the value of the current congestion window; or the third processing unit 25 is further configured to, when the value of the current congestion window is greater than or equal to the buffer threshold, add min (½, BETA/cwnd) to the value of the current congestion window every time when the sending end receives one ACK, where min (½, BETA/cwnd) indicates the smaller one of ½ and BETA/cwnd, and the BETA is an adaptive parameter that is greater than 1 and its value is in direct proportion to a minimum round trip delay detected by the sending end and a network packet loss ratio.

In this embodiment of the present invention, the value of the congestion window can be adjusted according to an ACK received in real time, so that a proper value of the congestion window is maintained and that the network can have better data transmission performance.

Figure 5:
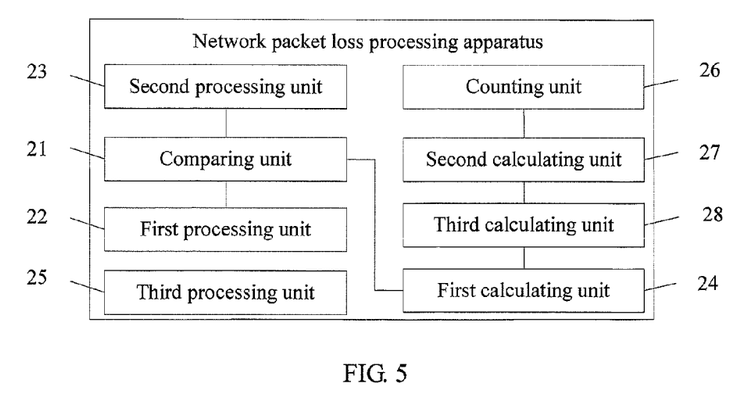
FIG. 5 is a composition block diagram of another network packet loss processing according to Embodiment 2 of the present invention.

It should be noted that the ALPHA value and the BETA value may be obtained according to calculation of the LD, and for details, reference may be made to the corresponding formula in Embodiment 1. When the ALPHA value and the BETA value are calculated, as shown in FIG. 5, the apparatus further includes: a counting unit 26, a second calculating unit 27, and a third calculating unit 28.

The counting unit 26 is configured to count the number of acknowledgement signals ACKs received within a predetermined time period and the number of packet loss events; for a specific description about counting the number of acknowledgement signals ACKs received within the predetermined time period and the number of packet loss events by the counting unit 26, reference may be made to the corresponding description in Embodiment 1.

The second calculating unit 27 is configured to divide the number of ACKs received within the predetermined time period by the number of packet loss events to obtain a packet loss interval within the predetermined time period, where the number of ACKs received within the predetermined time period is obtained by the counting unit 26.

The third calculating unit 28 is configured to calculate a value of the ALPHA and a value of the BETA according to the packet loss interval within the predetermined time period, where the packet loss interval within the predetermined time period is obtained by the second calculating unit 27. For details about calculating the value of the ALPHA and the value of the BETA by the third calculating unit 28 according to the packet loss interval within the predetermined time period, where the packet loss interval within the predetermined time period is obtained by the second calculating unit 27, reference may be made to the corresponding description in formula (2) and formula (4) in Embodiment 1.

Figure 6:
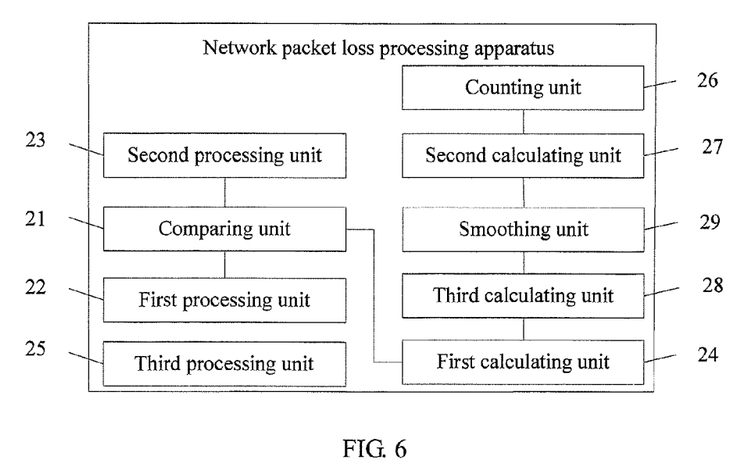
FIG. 6 is a composition block diagram of another network packet loss processing according to Embodiment 2 of the present invention.

Further, to avoid great fluctuation of an LD value obtained through calculation, after the LD is obtained through calculation, in this embodiment of the present invention, smooth processing may further be performed on the obtained LD, so that the obtained LD value is relatively smooth. As shown in FIG. 6, the apparatus further includes a smooth processing unit 29.

The smooth processing unit 29 is configured to perform smooth processing on the packet loss interval within the predetermined time period by using a {½, ½} smooth filter after the second calculating unit 27 obtains the packet loss interval within the predetermined time period, to obtain a smooth-processed packet loss interval within the predetermined time period, where {½, ½} indicates that a half of values passing through the filter are old values, and that a half of values passing through the filter are new values. For details about performing smooth processing on the packet loss interval within the predetermined time period by using a {½, ½} smooth filter by the smooth processing unit 29 to obtain a smooth-processed packet loss interval within the predetermined time period, reference may be made to the corresponding description in formula (3) in Embodiment 1.

The third calculating unit 28 is further configured to calculate the value of the ALPHA and the value of the BETA according to the packet loss interval within the predetermined time period, where the packet loss interval within the predetermined time period has undergone smooth processing performed by the smooth processing unit 29.

To fully demonstrate an effect of this embodiment of the present invention, during implementing this embodiment of the present invention, specifically, a TCP end-to-end data connection is established in server-client mode to perform a network test. Specifically, by comparing an average TCP throughput within a time period and a trend of a TCP throughput, which changes with time, comparison between data transmission performance achieved in this embodiment of the present invention and TCP data transmission performance in the prior art is demonstrated. Specifically, the TCP Cubic/TCP Reno/TCP Westwood in the prior art is used for comparison.

The TCP Cubic is a TCP algorithm proposed for a network that has a long round trip delay, and introduces a "binary search" mechanism in a "congestion avoidance" phase of TCP Reno, so that TCP can increase to a network bandwidth balance point faster. The TCP Cubic introduces a variable as an upper threshold of binary increase, marked as Wmax. Wmax is initialized to 0, and a Wmax value is updated every time when the sending end detects a packet loss event. If a current cwnd is smaller than Wmax, assume Wmax=cwnd*(2-beta)/2, where beta is a multiplication window decrease factor; if cwnd is greater than or equal to Wmax, assume Wmax=cwnd. As described in the foregoing, for a conventional TCP Reno in the "congestion avoidance" phase, a cwnd value increases by 1/cwnd every time when a sending end receives one ACK; and in the TCP Cubic, the cwnd value increases by bic_inc/cwnd every time when the sending end receives one ACK and when a condition that Wmax>cwnd is satisfied, where bic_inc=(Wmax−cwnd)/2.

The TCP Reno uses a cwnd-ssthresh congestion control framework to manage a congestion window. When cwnd<ssthresh, it indicates that TCP is in a "slow start" state, and the cwnd value increases by 1 every time when the sending end receives one ACK; and when cwnd>=ssthresh, the cwnd value increases by 1/cwnd every time when the sending end receives one ACK. The TCP Reno initializes ssthresh and cwnd to infinity and 1, respectively; when the sending end receives three consecutive repeated ACKs, assume ssthresh=cwnd/2, and cwnd=ssthresh+3; and when the sending end detects a timeout signal of a retransmission timer, assume ssthresh=cwnd/2, and cwnd=1.

The TCP Westwood puts forward a bandwidth estimation mechanism based on the TCP Reno to calculate bandwidth estimation BWE and RTTmin of a current network. As described in the foregoing, when a TCP Reno sending end detects a packet loss event, assume that a "slow start" threshold ssthresh is backed off to cwnd/2; and when a TCPW sending end detects a packet loss event, assume that the "slow start" threshold ssthresh is backed off to BWE*RTTmin/MSS (usually the value is greater than cwnd/2). In addition, the TCPW reserves all other congestion control manners of the TCP Reno.

Figure 7:
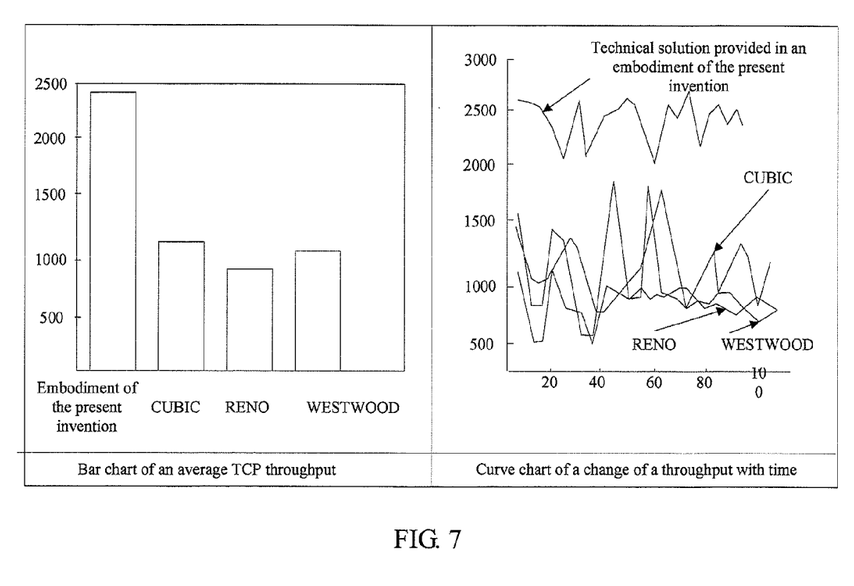
FIG. 7 is an effect diagram of a WIFI accessed network environment according to an embodiment of the present invention.

First, by taking a WIFI accessed network environment as an example, as shown in FIG. 7, it can be seen from a bar chart of an average throughput and a curve chart of a change of an throughput with time that, performance of a technical solution provided in an embodiment of the present invention is the best, and next is the Cubic. In addition, compared with the Cubic, the performance of the technical solution provided in the embodiments of the present invention is improved by 100%+.

Second, by taking a network environment of the CDMA 2000 network of China Telecom as an example, a CDMA 2000 3G Internet card has two working modes: One is 3G mode with a nominal bandwidth of 3 Mbps, and the other is 1X mode (usually called a 2G mode) with a nominal bandwidth of 152 kbps.

Figure 8:
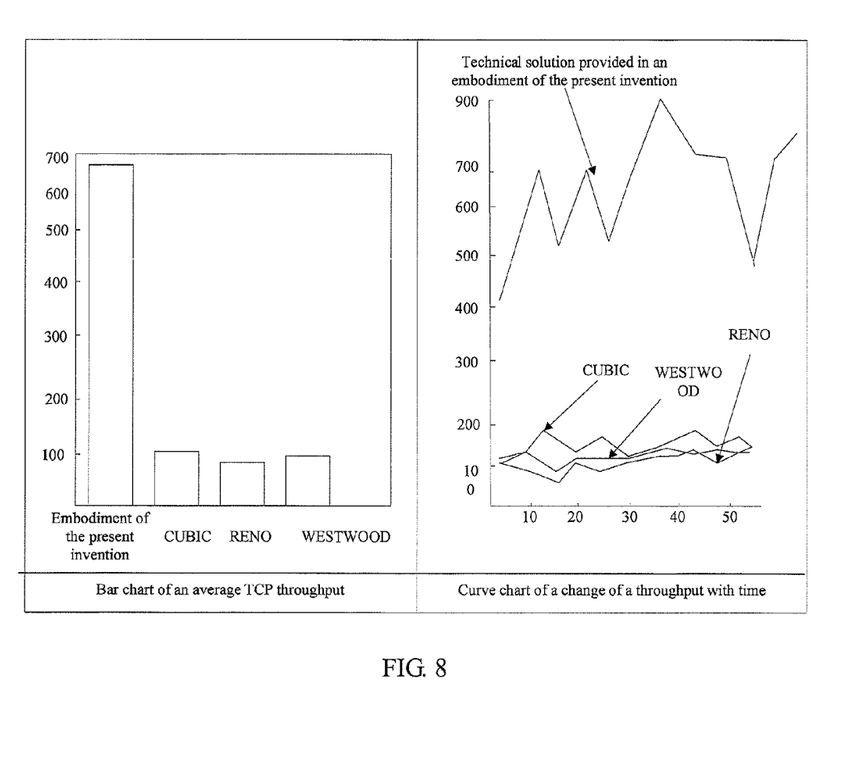
FIG. 8 is an effect diagram of a 3G wireless network according to an embodiment of the present invention.

As shown in FIG. 8, it can be seen from a bar chart of an average throughput and a curve chart of a change of an throughput with time, in a 3G wireless network, compared with the poorer performance of Cubic, performance of a technical solution provided in an embodiment of the present invention is improved by 300%+.

Through the foregoing description of the embodiments, persons skilled in the art may clearly understand that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, hard disk, or optical disk of a computer, and includes several instructions for instructing a computer device (which may be a personal computer, a server, a network device, or the like) to execute the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A network packet loss processing method, comprising:
comparing, at a comparing unit of a network packet loss processing apparatus, a value of a current congestion window of a network with a buffer threshold when a packet loss event is detected, wherein the buffer threshold is used to indicate a data bearing capability of the entire network, wherein the data bearing capability is obtained by adding a data bearing capability of a link in the network and a data bearing capability of a buffer of a node in the network;
if the value of the current congestion window is smaller than the buffer threshold, not performing backoff processing on the current congestion window; and
if the value of the current congestion window is greater than or equal to the buffer threshold, performing backoff processing on the current congestion window;
wherein the buffer threshold is obtained through the following formula, and the formula is:

$$m\_cwnd = \frac{BWE * RTTmin}{MSS} + \frac{BWE * ALPHA}{MSS},$$

wherein:
m-cwnd indicates the buffer threshold, and its value is an integer that is greater than 0;

$$\frac{BWE * RTTmin}{MSS}$$

indicates a data bearing capability of a link in the network, wherein BWE indicates a transmission bandwidth of a link from a sending end to a receiving end in network transmission and its value is an integer that is greater than 0, RTTmin indicates a minimum round trip delay detected by the sending end and its value is an integer that is greater than 0, and MSS indicates a maximum segment size used in network transmission and its value is an integer that is greater than 0; and $$\frac{BWE * ALPHA}{MSS}$$

indicates a data bearing capability of a buffer of a node in the network, wherein BWE indicates the transmission bandwidth of the link from the sending end to the receiving end in the network transmission and its value is an integer that is greater than 0, ALPHA indicates an adaptive parameter of the data bearing capability of the buffer of the node in the network and its value is in direct proportion to the minimum round trip delay detected by the sending end and a network packet loss ratio, and MSS indicates the maximum segment size used in the network transmission and its value is an integer that is greater than 0.

2. The method according to claim 1, wherein the ALPHA is obtained through the following formula, and the formula is:

$$ALPHA = \frac{k * RTTmin}{LD},$$

wherein:
k is a scaling factor that is greater than 1; RTTmin is the minimum round trip delay detected by the sending end and its value is an integer that is greater than 0; and LD is a packet loss interval that is in inverse proportion to the packet loss ratio, and is determined by the number of packets received on average when one packet loss event is detected.

3. The method according to claim 1, further comprising: A network packet loss processing method, comprising:
comparing, at a comparing unit of a network packet loss processing apparatus, a value of a current congestion window of a network with a buffer threshold when a packet loss event is detected, wherein the buffer threshold is used to indicate a data bearing capability of the entire network, wherein the data bearing capability is obtained by adding a data bearing capability of a link in the network and a data bearing capability of a buffer of a node in the network;
if the value of the current congestion window is smaller than the buffer threshold, not performing backoff processing on the current congestion window; and
if the value of the current congestion window is greater than or equal to the buffer threshold, performing backoff processing on the current congestion window, wherein;
after one ACK signal used for acknowledging in network transmission is received, when the value of the current congestion window is smaller than a slow start threshold ssthresh, adding 1 to the value of the current congestion window every time when a sending end receives one ACK;
when the value of the current congestion window is greater than or equal to the slow start threshold and is smaller than the buffer threshold, adding max(1,(m_cwnd−cwnd)/2) to the value of the current congestion window every time when the sending end receives one ACK, wherein max(1,(m_cwnd−cwnd)/2) indicates the greater one of 1 and (m_cwnd−cwnd)/2, the m_cwnd is the buffer threshold, and the cwnd is the value of the current congestion window; and
when the value of the current congestion window is greater than or equal to the buffer threshold, adding min(½, BETA/cwnd) to the value of the current congestion window every time when the sending end receives one ACK, wherein min(½, BETA/cwnd) indicates the smaller one of ½ and BETA/cwnd, and the BETA is an adaptive parameter that is greater than 1 and its value is in direct proportion to a minimum round trip delay detected by the sending end and a network packet loss ratio.

4. The method according to claim 3, wherein the BETA is obtained through the following formula, and the formula is:

$$BETA = 2^{\frac{s}{LD}} * \max\left[1, \left(\frac{RTTmin}{t}\right)\right],$$

wherein:
s is a scaling factor that is greater than 1; LD is a packet loss interval that is in inverse proportion to the packet loss ratio, and is determined by the number of packets received on average when one packet loss event is detected; RTTmin is the minimum round trip delay detected by the sending end and its value is an integer that is greater than 0; t is reference time and its value is an integer that is greater than 0; and $$\max\left[1, \left(\frac{RTTmin}{t}\right)\right]$$

indicates the greater one of 1 and $$\left(\frac{RTTmin}{t}\right).$$

5. The method according to claim 2, further comprising:
counting the number of acknowledgement signals ACKs received within a predetermined time period and the number of packet loss events;
dividing the number of ACKs received within the predetermined time period by the number of packet loss events to obtain a packet loss interval within the predetermined time period; and
calculating a value of the ALPHA and a value of the BETA according to the packet loss interval within the predetermined time period.

6. The method according to claim 5, wherein: after obtaining the packet loss interval within the predetermined time period, the method further comprises:
performing smooth processing on the obtained packet loss interval within the predetermined time period by using a {½, ½} smooth filter to obtain a smooth-processed packet loss interval within the predetermined time period, wherein {½, ½} indicates that a half of values passing through the filter are old values, and that a half of values passing through the filter are new values; and
calculating the value of the ALPHA and the value of the BETA according to the packet loss interval within the predetermined time period comprises: calculating the value of the ALPHA and the value of the BETA according to the smooth-processed packet loss interval within the predetermined time period.

7. A network packet loss processing apparatus, comprising:
a comparing unit, configured to compare a value of a current congestion window of a network with a buffer threshold when a packet loss event is detected, wherein the buffer threshold is used to indicate a data bearing capability of the entire network, wherein the data bearing capability is obtained by adding a data bearing capability of a link in the network and a data bearing capability of a buffer of a node in the network;
a first processing unit, configured not to perform backoff processing on the current congestion window, when the comparing unit determines that the value of the current congestion window is smaller than the buffer threshold;
a second processing unit, configured to perform backoff processing on the current congestion window, when the comparing unit determines that the value of the current congestion window is greater than or equal to the buffer threshold;
a first calculating unit, configured to obtain the buffer threshold through the following formula, and the formula is:

$$m\_cwnd = \frac{BWE * RTTmin}{MSS} + \frac{BWE * ALPHA}{MSS},$$

wherein:
m-cwnd indicates the buffer threshold, and its value is an integer that is greater than 0;

$$\frac{BWE * RTTmin}{MSS}$$

indicates a data bearing capability of a link in the network, wherein BWE indicates a transmission bandwidth of a link from a sending end to a receiving end in network transmission and its value is an integer that is greater than 0, RTTmin indicates a minimum round trip delay detected by the sending end and its value is an integer that is greater than 0, and MSS indicates a maximum segment size used in network transmission and its value is an integer that is greater than 0; and $$\frac{BWE * ALPHA}{MSS}$$

indicates a data bearing capability of a buffer of a node in the network, wherein BWE indicates the transmission bandwidth of the link from the sending end to the receiving end in the network transmission and its value is an integer that is greater than 0, ALPHA indicates an adaptive parameter of the data bearing capability of the buffer of the node in the network and its value is in direct proportion to the minimum round trip delay detected by the sending end and a network packet loss ratio, and MSS indicates the maximum segment size used in the network transmission and its value is an integer that is greater than 8.

8. A network packet loss processing apparatus, comprising:
a comparing unit, configured to compare a value of a current congestion window of a network with a buffer threshold when a packet loss event is detected, wherein the buffer threshold is used to indicate a data bearing capability of the entire network, wherein the data bearing capability is obtained by adding a data bearing capability of a link in the network and a data bearing capability of a buffer of a node in the network;
a first processing unit, configured not to perform backoff processing on the current congestion window, when the comparing unit determines that the value of the current congestion window is smaller than the buffer threshold;
a second processing unit, configured to perform backoff processing on the current congestion window, when the comparing unit determines that the value of the current congestion window is greater than or equal to the buffer threshold; and
a third processing unit, configured to, when the value of the current congestion window is smaller than a slow start threshold ssthresh, add 1 to the value of the current congestion window every time when a sending end receives one ACK, after one ACK signal used for acknowledging in network transmission is received; or
further configured to, when the value of the current congestion window is greater than or equal to the slow start threshold and is smaller than the buffer threshold, add max(1,(m_cwnd−cwnd)/2) to the value of the current congestion window every time when a sending end receives one ACK, wherein max(1,(m_cwnd−cwnd)/2) indicates the greater one of 1 and (mcwnd−cwnd)/2, the m_cwnd is the buffer threshold, and the cwnd is the value of the current congestion window; or further configured to, when the value of the current congestion window is greater than or equal to the buffer threshold, add min(½, BETA/cwnd) to the value of the current congestion window every time when a sending end receives one ACK, wherein min(½, BETA/cwnd) indicates the smaller one of ½ and BETA/cwnd, and the BETA is an adaptive parameter that is greater than 1 and its value is in direct proportion to a minimum round trip delay detected by the sending end and a network packet loss ratio.

9. The apparatus according to claim 7, further comprising:
a counting unit, configured to count the number of acknowledgement signals ACKs received within a predetermined time period and the number of packet loss events;
a second calculating unit, configured to divide the number of ACKs received within the predetermined time period by the number of packet loss events to obtain a packet loss interval within the predetermined time period, wherein the number of ACKs received within predetermined time period is obtained by the counting unit; and
a third calculating unit, configured to calculate a value of the ALPHA and a value of the BETA according to the packet loss interval within the predetermined time period, wherein the packet loss interval within the predetermined time period is obtained by the second calculating unit.

10. The apparatus according to claim 9, further comprising:
a smooth processing unit, configured to perform smooth processing on the packet loss interval within the predetermined time period by using a {½, ½} smooth filter after the second calculating unit obtains the packet loss interval within the predetermined time period, to obtain a smooth-processed packet loss interval within the predetermined time period, wherein {½, ½} indicates that a half of values passing through the filter are old values, and that a half of values passing through the filter are new values; wherein the third calculating unit is further configured to calculate the value of the ALPHA and the value of the BETA according to the smooth-processed packet loss interval within the predetermined time period.

\* \* \* \* \*